Feb. 14, 1961 F. E. VACCARO 2,972,085
TUNABLE MAGNETRON
Filed Jan. 15, 1958 2 Sheets-Sheet 1

INVENTOR.
FRANK E. VACCARO
BY
William A. Zalesak
ATTORNEY

Feb. 14, 1961 F. E. VACCARO 2,972,085

TUNABLE MAGNETRON

Filed Jan. 15, 1958 2 Sheets-Sheet 2

INVENTOR.
FRANK E. VACCARO
BY
William A. Zalesak
ATTORNEY 2,972,085

TUNABLE MAGNETRON

Frank E. Vaccaro, Orange, N.J., assignor to Radio Corporation of America, a corporation of Delaware Filed Jan. 15, 1958, Ser. No. 709,161
8 Claims. (Cl. 315—39.61)

This invention relates to high frequency multi-cavity magnetrons, and particularly though not exclusively to improvement in tuning means for use in the kind of tube disclosed in my copending application, serial No. 571,701, filed March 15, 1956, now Patent No. 2,915,675, granted December 1, 1959.

In that application, I disclosed a multi-cavity magnetron in which two or more of the anode cavities located at points angularly spaced from each other by 90° are tunable. I showed that with such an arrangement, a magnetron could be tuned over a considerable frequency range without moding difficulties and with improved electronic efficiency. However, the tuning means was designed to tune the magnetron anode to frequencies below the resonant frequency of the untuned anode. Except by making the tunable cavities unnecessarily long, that is, longer than a half wave length, the described tube could not be tuned to frequencies higher than the resonant frequency of the untuned anode. Consequently, this imposes a limitation on the tuning range of the device.

Accordingly, the principal object of this invention is to increase the tuning range of a tunable magnetron.

A further object is to be able to tune a magnetron above as well as below the resonant frequency of the untuned anode without unduly extending the length of the tunable cavities.

I achieve these and other objects in accordance with this invention by modifying one or more of the anode cavities of a multi-cavity magnetron so that they are narrower and thus electrically shorter than the untuned anode cavities. In addition, each tunable cavity includes an extension of the anode cavity walls, with a smooth joint to produce close and wide band coupling therebetween. By shortening the electrical length of the tunable cavities, i.e. decreasing their inductance, I am able, by means of slidable shorting bars, to tune them to a frequency above the resonant frequency of the untuned anode with the bar in the zero position. Then, by moving the bar outwardly, I can tune progressively towards and then below said resonant frequency, with comparative smoothness. I am thus able to extend the tuning range of the device. Furthermore, the improved coupling between the anode cavity and its extension, which in effect are merged into a single tunable cavity, also extends the tuning range. Furthermore, from field symmetry consideration, one can obtain a maximum amount of tuning for a given field distortion by tuning above as well as below the symmetrical position, that is, the resonant frequency of the untuned anode.

Figure 1:
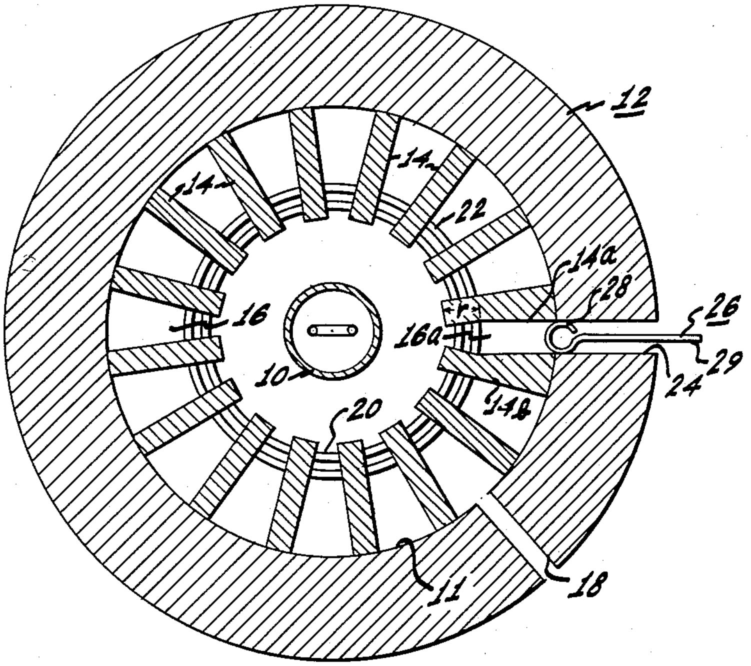
Fig. 1 is a plan view of a magnetron anode block incorporating one embodiment of the invention.

In Fig. 1, a portion of a magnetron is shown wherein a cathode 10 is mounted centrally of a block 12 having a cylindrical opening 11 in which are mounted a series (sixteen, as shown) of radially extending anode vanes 14, the inner ends of which define a cylindrical interaction or cathode space. The vanes 14 together with the surrounding anode block 12 form an annular series or array of anode cavities 16. Suitable means, such as a quarter-wave output transformer slot 18, is coupled to one of the anode cavities 16 for coupling to an output waveguide (not shown). Alternate ones of the vanes 14 are preferably strapped together in known manner, as by a pair of annular rings or straps 20 and 22, to favor $\pi$-mode operation of the magnetron. The shape and size of the anode cavities 16 and the straps 20 and 22 determine the natural or untuned resonant frequency of the magnetron.

In the embodiment shown in Fig. 1, all the anode cavities 16 formed by the vanes 14 and block 12 are identical except one, namely cavity **16*a*, which is distinguished from the rest by being tunable and having a smaller width at the outer end. This one cavity 16*a* is founded by pair of vanes 14*a* and 14*b*** whose opposing walls are identical to the other vanes only for a small radial distance *r*, but instead of diverging further beyond the distance *r* the walls continue in parallel direction and merge with the walls of a radial slot 24 formed in the annular block 12. The parallel walls of the anode vanes **14*a* and 14*b* and slot 24 thus combine to form the side walls of a tunable elongated cavity 16*a* of width smaller than the width of the other anode cavities at the outer ends. A plunger 26 comprising a shorting bar 28 at its forward end and an operating shaft 29 is slidably mounted within the slot 24 so as to be movable axially therein and radially with respect to the anode block 12. The shorting bar 28 bridges the gap between the side walls of the cavity 16*a*** and thus forms a movable end wall of that cavity by which the electrical length thereof may be varied to tune the same.

It is apparent that with the shorting bar 28 in the position shown, that is, at a distance from the vane tips coinciding with the radial length of the untuned cavities 16, the electrical length of the cavity **16*a* is less than that of the untuned cavities 16. This is so because of the smaller width at the outer end, and hence smaller inductance, of the cavity 16*a*. Therefore, in accordance with well known principles, the anode will be tuned to a frequency higher than that of the normal resonant frequency of the untuned cavities, and by moving the shorting bar 28 inwardly, the frequency can be raised still higher. As the bar 28 is moved radially outward beyond the position shown, the electrical length of the cavity 16*a* can be increased to a point where it equals the length of the untuned cavities 16. At this point, the anode will be tuned to its normal resonant frequency. As the bar 28** is moved outwardly beyond this point, the electrical length increases beyond a quarter-wave length and the resonant frequency of the anode is lowered.

One advantage of the above design which permits tuning above and below the normal resonant frequency of the anode is that the tuning range of the magnetron is considerably increased as compared to a design where all the anode cavities are identical. In addition, the close coupling obtained by merging the opposing faces of vanes **14*a* and 14*b* with the faces of slot 24** so as to provide a smooth transition therebetween further extends the tuning range.

The anode vanes **14*a* and 14*b* are shown as having a different, that is, a closer spacing at their inner tips than at their outer extremities. This gives the designer freedom to make vanes having a spacing which is different from the width of the remainder of the tunable cavity. However, in some designs it may be preferred to use uniform and constant wall spacing throughout the entire cavity 16a**.

Figure 2:
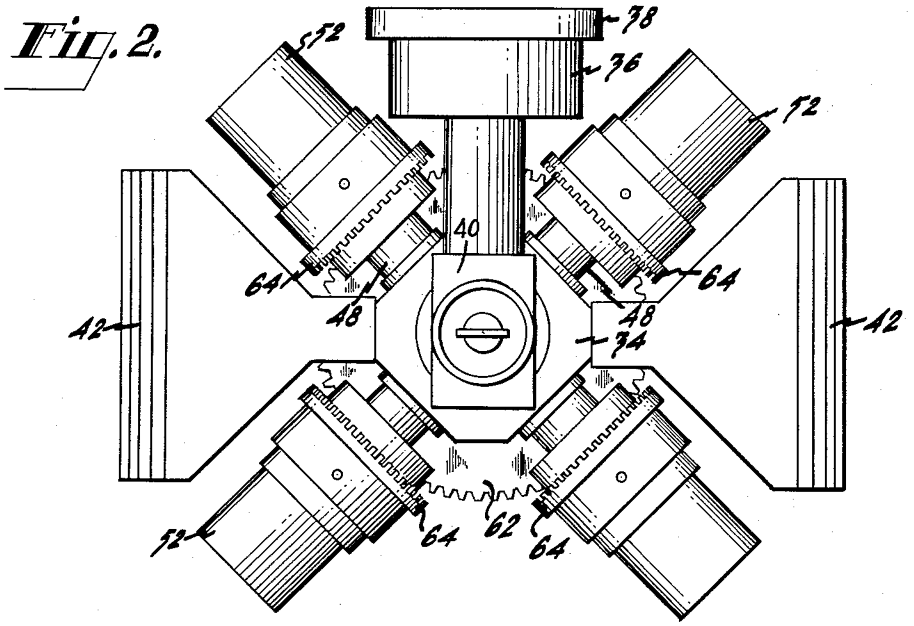
Fig. 2 is a top plan view of a magnetron employing four equally spaced tunable cavities according to the invention.
Figure 3:
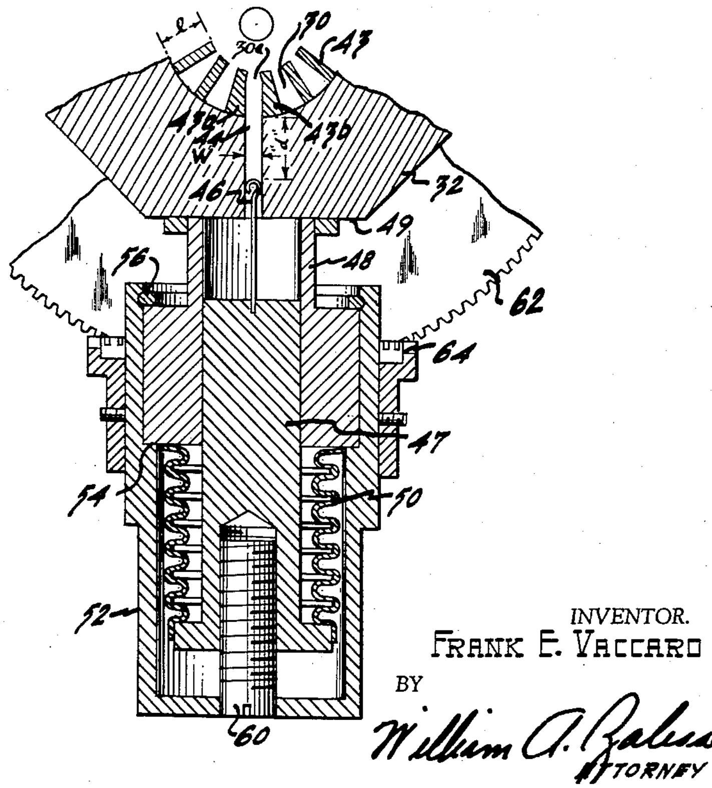
Fig. 3 is an enlarged axial sectional view of one of the tunable anode cavities of Fig. 2.

Figs. 2 and 3 show a magnetron structure incorporating a multi-cavity vane structure similar to that shown in Fig. 1 except for the provision of four tunable cavities 30a symmetrically arranged at 90° intervals around the annular anode cavity array in the manner shown and for the purpose described in my copending application Serial No. 571,701, now Patent No. 2,915,675. This structure comprises an anode block or plate 32 sandwiched between two end plates 34 one of which is shown in Fig. 2. An output transformer slot (not shown) opens into a wave guide coupling member 36 provided with a coupling flange 38, for connection to an output waveguide. The magnetron is provided with two pole pieces 40, one of which is shown, sealed to the end plates 34 and may also be provided with heat radiating fins 42 attached to the anode block and end plates.

The anode block 32 is formed with anode vanes 43 forming anode cavities 30, eight of which vanes 43a and 43b define portions of the side walls of four tunable cavities 30a at 90° intervals (one of which is shown in Fig. 3). The width of each tunable cavity 30a is smaller than that of the untuned cavities 30. The anode block is formed with a radial slot 44, the side walls of which merge smoothly with and form extensions of each pair of vanes 43a and 43b. Each tunable cavity 30a includes a tuning plunger 46 slidably mounted in the slot 44. Each plunger 46 is attached to a cylinder 47 which is slidably mounted in a sleeve 48 sealed to the anode block and end plates at the face 49. A flexible bellows 50 is sealed to the cylinder 47 and sleeve 48 to complete the vacuum envelope of the tube while permitting movement of the tuning plunger 46. As shown in Figs. 2 and 3, each tuning plunger is actuated by a tuning knob 52 rotatably mounted on the sleeve 48, as by means of an internal shoulder 54 and split spring ring 56 engaging the ends of an enlarged portion of the sleeve. The knob 52 has a central pin or stud 60 threaded into the cylinder 47, whereby rotation of the knob effects axial movement of the tuning plunger 46 in the cavity 30a to change the length thereof.

As shown in Fig. 2, the magnetron may be provided with a large gear 62 mounted for rotation about the axis of the magnetron and engaging four smaller gear rings 64 attached to the four tuning knobs 52, for restraining the four tuning plungers 46 to simultaneous and equal movement in the four tuning cavities 30a. The four plungers can be simultaneously actuated by manually turning one of the tuning knobs 52, or by means of an additional gear (not shown) engaged with the large gear 62 and provided with operating means (not shown).

As taught in my copending application, the employment of four tuning cavities at 90° intervals permits tuning over a considerable frequency range without moding difficulties and with improved electronic efficiency. I have found that by means of the present invention, wherein the width of the four tunable cavities is made smaller than that of the untuned cavities, I can increase the tuning range of such a magnetron to 16% as compared to a tuning range of 11% obtained for the same plunger displacement on a tube with all anode vanes identical, as will be shown in Fig. 4.

Figure 4:
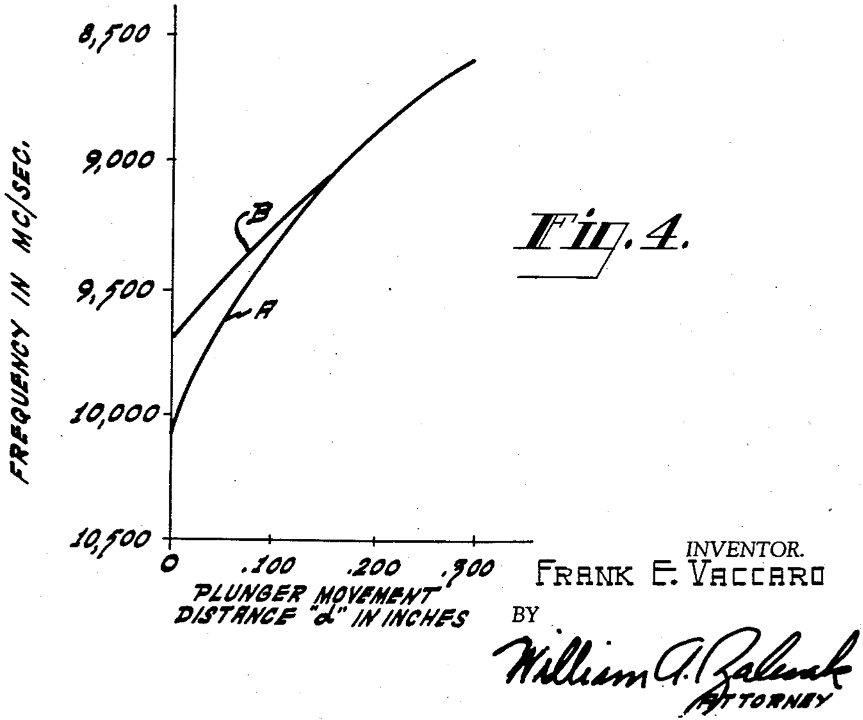
Fig. 4 is a graph showing a comparison between tuning curves obtained from tubes with and without the present invention.

Fig. 4 shows a comparison of tuning curves obtained with a tube made in accordance with the invention as shown in Figs. 2 and 3 and a tube without the invention. Curve A shows the variation in frequency with variation in the distance *d* of the tuning plunger for a tube utilizing the invention, wherein the width *w* of each tunable cavity 30a was .050". Curve B shows the variation in frequency for a tube wherein each slot 44 of .050" width opens into an anode cavity similar to the other anode cavities 30 and having a width equal to .099" at its outer radial extremity. The curves show the variation in frequency as the plungers 46 are moved outwardly from their zero positions at the outer extremities of the vanes 43. Curve A shows an increase in the useful tuning range at the high frequency end, from a high of about 9700 megacycles obtained with the tube of curve B, to a new high of over 10,000 megacycles.

What is claimed is:

1. A tunable magnetron including a cathode, an anode structure symmetrical about said cathode and comprising conductive means forming an annular array of radially-extending anode cavities, at least one of said cavities being tunable and the remaining cavities being untuned, said untuned cavities having identical geometry including a predetermined length and a predetermined width at the outer end, said tunable cavity having a width at its outer end less than said untuned cavities and having parallel side walls extending radially outwardly beyond said untuned cavities and having a radially movable end wall extending between said side walls, whereby the electrical length of said tunable cavity can be adjusted by moving said end wall from an inner position wherein the electrical length of said tunable cavity is less than said untuned cavities to an outer position wherein the electrical length of said tunable cavity is greater than said untuned cavities, to either increase or decrease the operating frequency of the magnetron relative to the untuned frequency.

2. A magnetron according to claim 1, wherein said tunable cavities include at least two identical tunable cavities separated by 90°.

3. A magnetron according to claim 1, wherein said tunable cavities consist of four identical tunable cavities separated by 90° intervals.

4. A magnetron according to claim 3, further including mechanically-ganged means for simultaneously and substantially equally adjusting the resonant frequency of said tunable cavities.

5. A magnetron as in claim 1, wherein said anode structure comprises an anode block having a cylindrical opening, and an annular array of radially extending flat plates mounted in said opening.

6. A tunable magnetron including a cathode, an anode structure symmetrical about said cathode and comprising conductive means forming an annular array of radially extending anode cavities and including means forming an outward extension of the side walls of each of four of said anode cavities which are angularly spaced 90° from each other around said array to form, with said four cavities, four identical mechanically-tunable cavities, the remainder of said anode cavities being untuned and having identical geometry including a predetermined length and a predetermined width at the outer end, each of said four tunable cavities having a width at the outer end less than said untuned cavities and having adjustable length, whereby the electrical length of said tunable cavities can be adjusted from a value less than that of said untuned cavities to a value greater than that of said untuned cavities.

7. A tunable magnetron including a cathode, an anode structure symmetrical about said cathode and comprising conductive means forming an annular array of radially extending anode cavities and including means forming an outward extension of each of four of said anode cavities which are angularly spaced 90° from each other around said array to form, with said four cavities, four identical mechanically-tunable cavities, the remainder of said anode cavities being untuned and having identical geometry including a predetermined length and a predetermined width at the outer end, each of said four tunable cavities having a width at the outer end less than said untuned cavities and having adjustable length, and mechanically-ganged means for simultaneously and substantially equally adjusting the resonant frequency of said four tuning cavities, whereby the electrical length of said tunable cavities can be adjusted from a value less than that of said untuned cavities to a value greater than that of said untuned cavities.

8. A tunable magnetron including an anode block formed with a cylindrical aperture, an annular array of radial anode vanes mounted in said aperture and defining a central cathode space, said vanes and the wall of said aperture forming an annular array of anode cavities which are open toward said space and coupled together to form a single resonant system, a cathode axially mounted in said cathode space, said anode block also formed with four radial slots having parallel walls forming continuations of four of said anode cavities which are angularly spaced 90° from each other around said array and conductive means cooperating with said walls of each slot to complete a tunable cavity, the remainder of said anode cavities being untuned and having identical geometry including a predetermined length and a predetermined width at the outer end, the width of each tunable cavity at the outer end being less than that of the untuned cavities, said conductive means including a tuning plunger radially slidable between said walls of each slot to close the outer end of each tunable cavity, and means external to said magnetron for actuating said tuning plungers, whereby the electrical length of said tunable cavities can be adjusted from a value less than that of said untuned cavities to a value greater than that of said untuned cavities.

References Cited in the file of this patent

UNITED STATES PATENTS

| | | |
|---|---|---|
| 2,418,469 | Hagstrum | Apr. 8, 1947 |
| 2,445,282 | Slater | July 13, 1948 |
| 2,466,765 | Hartman | Apr. 12, 1949 |
| 2,759,122 | Jenny | Aug. 14, 1956 |